June 4, 1946.　　J. A. VARNEY ET AL　　2,401,529
INFUSION APPARATUS
Filed May 29, 1940　　3 Sheets-Sheet 1
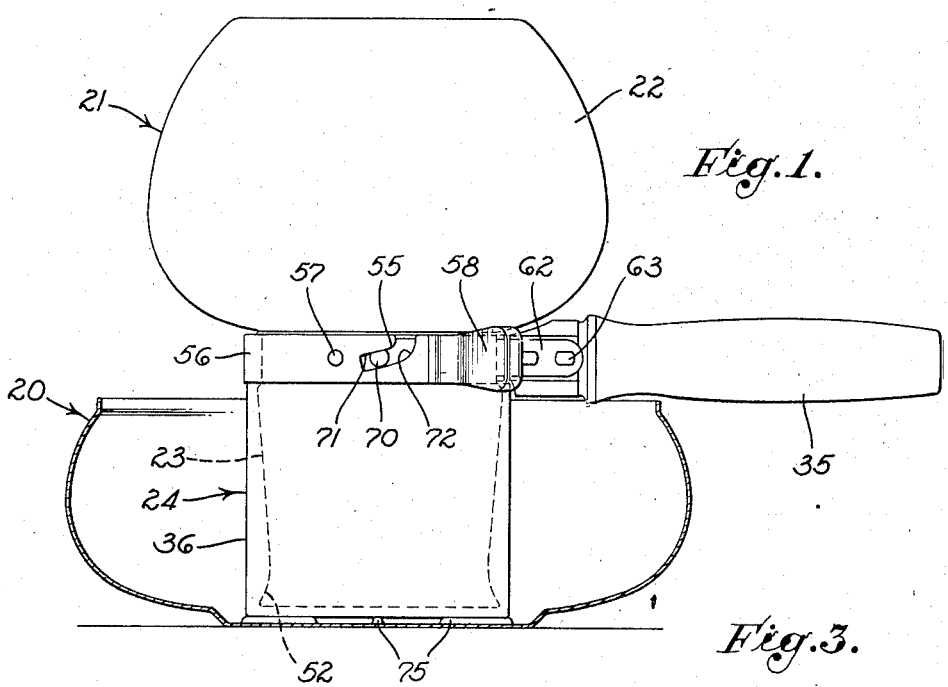
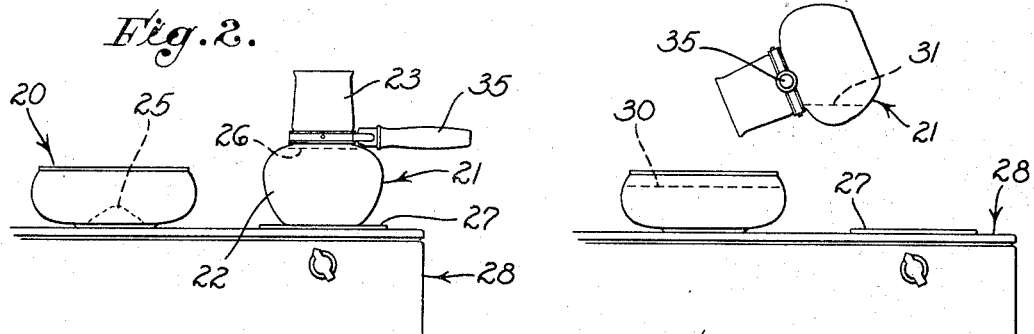
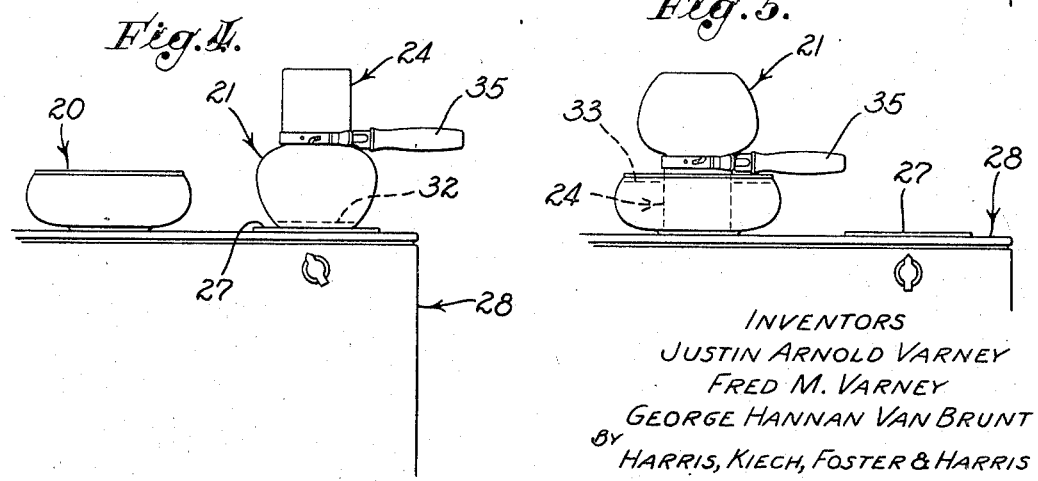
INVENTORS
JUSTIN ARNOLD VARNEY
FRED M. VARNEY
GEORGE HANNAN VAN BRUNT
BY HARRIS, KIECH, FOSTER & HARRIS
*Clarence F. Kiech*
FOR THE FIRM.
ATTORNEYS.

June 4, 1946.  J. A. VARNEY ET AL  2,401,529
INFUSION APPARATUS
Filed May 29, 1940  3 Sheets-Sheet 2
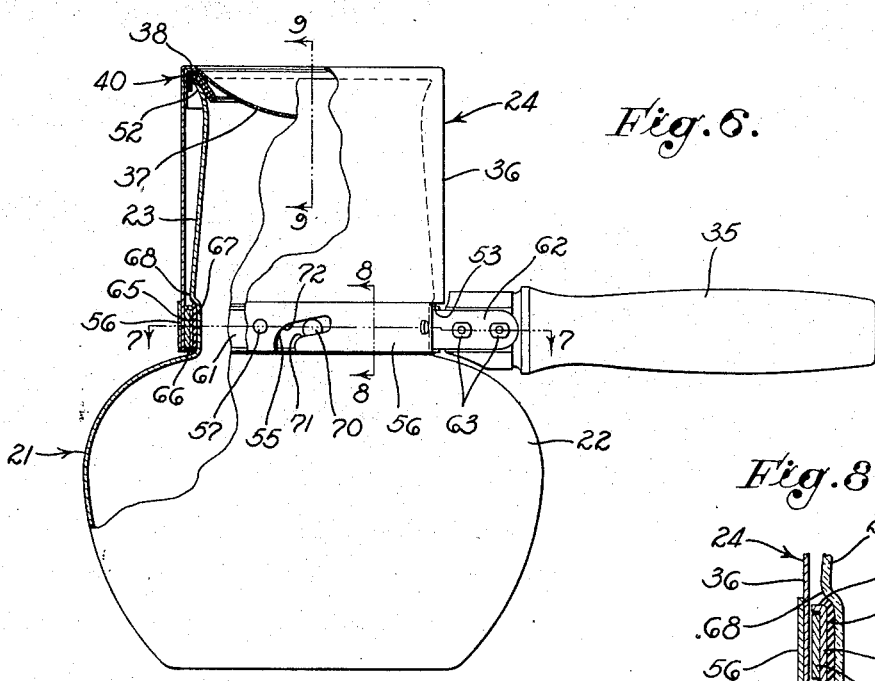
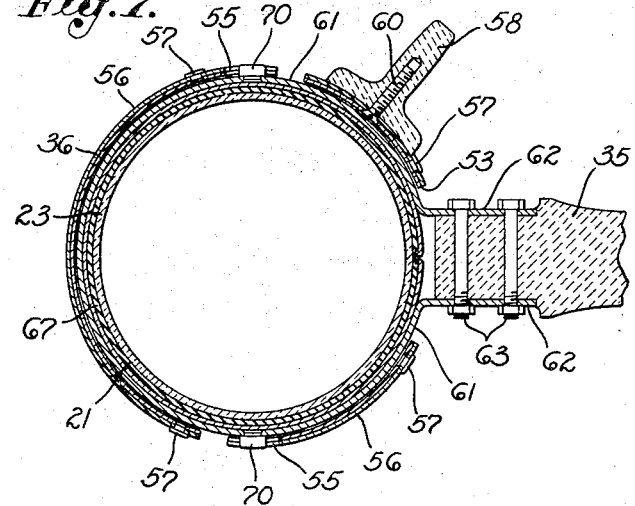
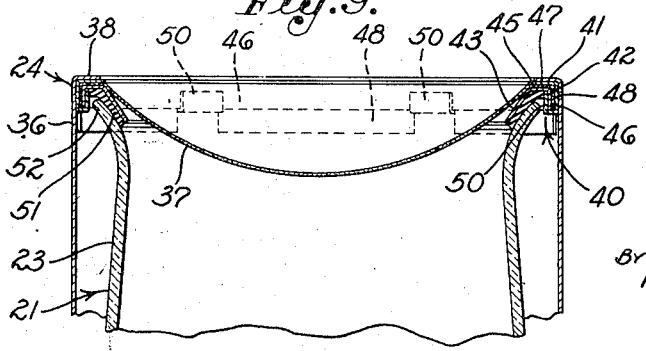
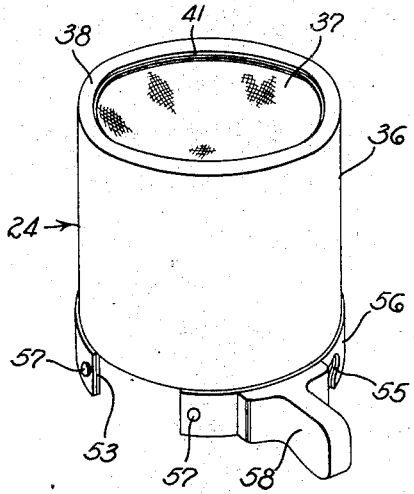
INVENTORS
JUSTIN ARNOLD VARNEY
FRED M. VARNEY
GEORGE HANNAN VAN BRUNT
BY HARRIS, KIECH, FOSTER & HARRIS
ATTORNEYS.

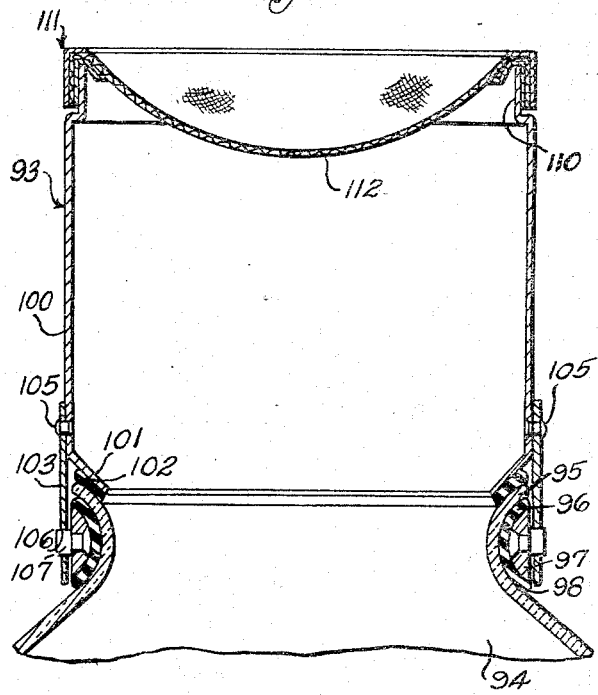
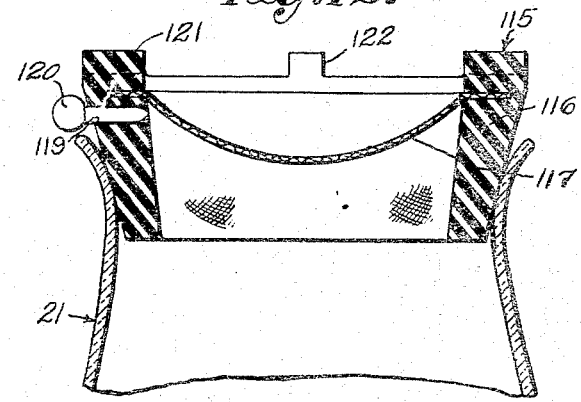

UNITED STATES PATENT OFFICE 2,401,529

INFUSION APPARATUS

Justin Arnold Varney, Fred M. Varney, and George Hannan Van Brunt, Los Angeles, Calif.

Application May 29, 1940, Serial No. 337,880

4 Claims. (Cl. 99—279)

Our invention relates to infusion devices in general, and more particularly is directed to apparatus for making liquid extracts from coffee beans, tea leaves, and the like.

Certain advantages inherent in our invention are of special importance in coffee brewing and lead us to confine the present disclosure to a coffee brewing apparatus. Those skilled in the art, however, will appreciate the fact that the invention is broadly applicable to infusion processes and sufficient guidance will be found herein for adapting the invention to other purposes than coffee brewing.

Flavor in brewed coffee is a subtle evanescent property, and the most desirable brew is to be achieved only by a procedure that correctly takes into account a number of critical factors. The temperature of the water must be high enough for efficient extraction of desirable constituents, but not so high as to extract significant quantities of certain undesirable constituents. Extraction at a temperature range from 185° to 205° is considered desirable. Infusion at a temperature below 185° results in inefficient extraction; and infusion at temperatures above 205° results in release of undesirable constituents such as tannic acid, bitter oils, etc.

The duration of the brewing operation is a further important consideration. Infusion is continuous throughout the period during which solids and liquids are in contact, but the character of elements released changes throughout that period. During the initial three to four minutes desirable constituents are released, but extraction beyond that period results in the release of undesirable elements. Closely related to this consideration is the fact that the brewing interval must be abruptly terminated and the infusion isolated from the coffee grounds immediately thereafter. In an ideal process complete isolation of the infusion from the coffee grounds and dregs would occur instantly and precisely at the optimum moment.

Also important in coffee brewing is the manner in which intimate contact and mixture of the liquid with the ground coffee is achieved. Continuous cycling of the liquid through the coffee grounds in the well known pump-percolating method, aside from the disadvantage of the inevitable high temperature, is undesirable in that because of channeling the percolating stream of liquid is concentrated on a portion of the coffee grounds with severe extraction effect. Progressive transition of a liquid body through a bed of coffee grounds, as in conventional "drip" filter methods, results in strong full-bodied flavor in the initial portion of liquid filtered. However, as filtering continues, the character of the liquid passing from the bed of grounds changes progressively toward a weaker brew containing undesirable constituents, with the end result that the infusion is a mixture of the good and the inferior extractions.

It is believed that brewing that is effective enough to extract the required ingredients and yet mild enough to produce good flavor requires intimate contact of the whole body of liquid with the ground coffee throughout the whole of the brewing period, so that the concentration of the entire brew rises progressively and uniformly throughout the infusion period to optimum strength. It is further believed that stirring or agitating the liquid body during the infusion period to cause intimate and uniform liquid contact with the ground coffee contributes favorably to the flavor of the final brew.

The general object of our invention is to provide an apparatus in accord with the above considerations. It is our purpose to provide means that may be manipulated without any specialized skill and yet offer close control of the brewing procedure and make easily possible uniform results in successive performances of the apparatus. More specifically, our object is to insure brewing coffee in the optimum temperature range under the most favorable extraction conditions for an optimum infusion period and to provide for efficient and rapid separation of the brew from the ground coffee at the end of the optimum period.

In our preferred form of apparatus for performing our method, we contemplate brewing the coffee in a container accessible for stirring and then at the proper time isolating the infusion by creating a partial vacuum to draw the liquid upward away from the grounds through a filter to a suitable reservoir.

Several objects in mind relate to the construction of such an apparatus. One of these objects is to provide means to develop the required vacuum to a highly effective degree with rapidity and to cause the liquid to be isolated with corresponding rapidity. Another object is to provide an efficient and highly convenient filter arrangement in the apparatus. A further object is to provide an apparatus that makes it possible to reduce the required procedure to simple steps involving minimum manipulation but without loss of control over the essential factors in the process. Additionally, we contemplate apparatus that is in itself of relatively simple construction, inexpensive to manufacture, sturdy and easy to clean.

The above and other objects and advantages of our invention will be apparent in the following description, considered with the accompanying drawings.

In the drawings, which are to be taken as illustrative only:

Fig. 1 is a side elevation of one form of our apparatus, a portion of the apparatus being shown in section;

Figs. 2 to 5 show diagrammatically the disposition of the apparatus at successive stages in the coffee making process;

Fig. 6 is a side elevation of a flask combination used in the apparatus of Fig. 1, being partly broken away for clarity;

Fig. 7 is a transverse section taken along the line 7—7 of Fig. 6;

Fig. 8 is a fragmentary section taken along the line 8—8 of Fig. 6;

Fig. 9 is a fragmentary longitudinal section taken as indicated by the line 9—9 of Fig. 6;

Fig. 10 is a perspective view of a combined shield and filter unit employed in this form of our invention; and Figs. 11 and 12 are fragmentary sectional views showing alternate forms of filter units that may be employed in the practice of our invention.

Fig. 1 shows a brewing receptacle or bowl generally designated 20 that is preferably relatively wide to hold a substantial volume of liquid at a moderate liquid depth. Inserted in the bowl 20 is a flask generally designated 21 having a body 22 and a neck 23, the flask by preference being made of some heat-resistant glass. A cylindrical filter unit generally designated 24 may be removably mounted on the neck 23. The description of the flask 21 and accessory elements that comprise with the flask what may be termed a flask combination may best be approached by referring first to the fundamental steps of the process for which the flask is designed.

In the first step of the preferred practice of our invention illustrated by Fig. 2, a measured quantity of ground coffee 25 is placed in the brewing receptacle 20 and a measured volume of water is placed in the flask 21, the liquid level in the flask being, for example, as indicated by the dotted line 26. Fig. 2 shows the flask 21 on a hot plate or burner 27 of a stove 28, the brewing receptacle 20 being on a nearby unheated surface of the stove. After the water in the flask 21 becomes heated to the desired temperature, the flask is elevated and tipped as indicated in Fig. 3 to pour a brewing volume of the heated water into the receptacle 20, the resultant liquid level being as indicated by the dotted line 30. At the tilted position of the flask shown in Fig. 3 a residual volume of the heated water remains in the body of the flask, the level of the residual liquid being at the dotted line 31.

During the next step of the process the flask 21 is back on the burner or hot plate 27 and is equipped with the filter unit 24. The level of the residual liquid is indicated by the dotted line 32, and infusion is taking place in the brewing receptacle 20. Preferably the operator stirs the contents of the receptacle 20 at the beginning of the brewing period to insure complete mixture. Steam engendered by the heating of the residual liquid in the flask to the boiling point largely displaces air from the flask, and near the end of the desired infusion period the steam-filled flask is removed from the burner 27 and inverted in the brewing receptacle 20, the neck of the flask and the surrounding filter unit being submerged in the brew as illustrated in Fig. 5.

Heat loss from the inverted flask by radiation from the relatively large exposed surfaces of the flask body 22 soon causes the steam trapped in the bowl to condense at a relatively rapid rate thereby creating a high degree of vacuum in the flask. The pressure differential between the interior of the flask and the atmosphere causes the liquid to flow upward from the brewing receptacle 20 through the filter unit 24 and the neck 23 into the body 22 of the inverted flask, the coffee grounds and dregs being held back by the filter unit. The immersion of the flask in the brew is timed to cause the transfer of the liquid infusion from the brewing receptacle to the flask at the end of whatever brewing interval is elected. After the transfer of the infusion the inverted flask is taken from the brewing receptacle, placed in upright position and freed of the filter unit, the flask thereafter serving as a container and pouring device for the finished coffee.

In accord with the described process, certain features are to be desired in the construction of the flask 21 and the filter unit 24. The body 22 should bulge rather abruptly at the base of the neck 23 to cause the required volume of residual liquid to be trapped in the manner indicated by Fig. 3. The body should be relatively large to present a relatively large radiation surface, thereby to favor rapid condensation when the flask is inverted and correspondingly rapid transfer of the infusion from the brewing receptacle to the flask. The neck 23 should be relatively long to space the body of the inverted flask above the liquid level 33 of Fig. 5 thereby to minimize heat transfer from the liquid in the brewing receptacle to the flask body. The neck 23 should be relatively long also to permit a suitable handle 35 to be mounted on the neck at a position to extend outward beyond the rim of the brewing receptacle 20 when the flask is inverted in the receptacle. The neck 23 furthermore should be of relatively large diameter to provide a relatively large filtering area for rapid transfer of infusion into the flask. Finally, the neck 23 should be both relatively long and relatively large in diameter to provide substantial capacity for liquid storage below the body of the inverted flask whereby the initial flow of the hot infusion into the inverted flask remains below the level of the flask body and therefore does not reverse or appreciably retard the condensation of steam in the flask body at the outset of the transfer flow. It will be understood, of course, that none of these specific features of configuration is essential in all practices of the invention.

When the flask is inserted in the receptacle as shown in Figs. 1 and 5, coffee grounds and dregs tend to cling to the immersed surfaces, hence the desirability of a cylindrical shield such as provided by the filter unit 24, the shield with the adhering solids being removed from the flask after the brewing period. The filter unit 24, then, is in effect a combined shield and filter means, the principal elements being a cylindrical shell 36 and a suitable filter member 37 spanning one end of the cylindrical shell. Preferably, the filter member 37 is a piece of glass cloth, but any type of filter means may be employed. The filter unit may also be regarded as a removable extension of the flask since in effect it increases the length of the flask neck and provides a mouth for and passage to the flask.

mouth of the inverted flask after equilibrium is reached.

A simple means of insuring free flow into the flask under the rim of the inverted filter unit is to indent the bottom of the brewing receptacle 20 or otherwise provide spaced elevations in the receptacle bottom to support the inverted flask. For example, as indicated in Fig. 1 a series of radially disposed ribs 75 may be formed by offsetting upwardly portions of the bottom of the receptacle 20 whereby the rim of the filter may form with the receptacle bottom a series of passages for inward radial flow.

When the flask with the attached filter unit is removed from the brewing receptacle after the liquid transfer to the flask, the filter unit retains a film of residue, but the neck of the flask is both clean and dry. The filter unit may be cleaned by a simple drenching operation and the flask has such a large neck that the usual difficulties of cleaning a coffee-making flask are not encountered.

We wish to call attention to the completeness with which the use of our apparatus and the practice of our method approaches the ideal technique of coffee-making. We make possible greater control of brewing time by virtue of the abrupt inception of infusion and greater rapidity of withdrawal of the infusion from the grounds than in any device of comparable capacity known to us. We facilitate greater control of temperature within the optimum range by virtue of the ability to commence infusion well within the ideal range and to end the infusion period well above the lower limit of the optimum range. And we realize markedly greater speed of production of coffee than in any other device of comparable capacity with which we are familiar by virtue of the large area of filter, the utilization of a pressure differential for accelerating filtration, and the highly efficient production of this differential. Moreover, we believe that the process of inverting our vessel produces new and useful results in that it allows for ease and safety of manipulation and simplicity of structure in vacuum-type coffee-making apparatus not, to our knowledge, heretofore achieved.

As previously noted the filter unit 24 employed in the form of our invention illustrated in Fig. 6 may be regarded as a removable extension of the flask 21, the extension providing a mouth for the flask and a fluid passage into the flask. The fact that the filter unit may be regarded in this light is emphasized by the modification shown in Fig. 11 in which a filter unit generally designated 93 is in effect a removable neck for a flask 94.

At the mouth of the flask 94 the rim 95 is flared to provide an external annular groove 96 of arcuate cross-sectional configuration which is embraced by a metal collar 97 having a rubber liner 98 to prevent relative rotation of the collar.

The filter unit 93 may comprise a metal cylinder 100 having an inwardly inclined bottom flange 101 with a rubber facing ring to function as a gasket against the flask rim 95. To hold the filter unit 93 in engagement with the flask 94 in a manner to place the facing ring 102 under sealing pressure, a metal skirt 103 may be secured to the cylindrical body 100 by suitable rivets 105 and provided with bayonet slots 106 to cooperate with complementary bayonet studs 107 on the metal collar 97. In the particular construction shown the upper end portion 110 of the metal cylinder 100 is preferably reduced in diameter to receive a removable filter assembly 111. The filter assembly 111 may be a complementary ring of sheet metal formed to the configuration shown to clamp the margin of a circular filter member 112. The manner in which the form of apparatus shown in Fig. 11 is to be employed in practicing the process does not require detailed explanation in view of previous discussion.

Fig. 12 discloses how a simplified filter unit generally designated 115 may be employed with the previously described flask 21 instead of the first-mentioned filter unit 24. The filter unit 115 comprises a rubber bushing 116 shaped and dimensioned to be removably inserted in the mouth of the flask 21 in the manner of a stopper. The margin of a filter member 117 is embedded in the body of the rubber bushing.

In practice the steam-engendered vacuum in the flask often persists after the liquid is drawn upward into the flask from the brewing receptacle because coffee grounds and sediment tend to seal the interstices of the filter member. One purpose of the bayonet slots in the previously described filter units is to provide a cam action for separating a filter unit from a flask to destroy any vacuum that may persist in the flask. In the form of the invention shown in Fig. 12 a vent hole 119 through the rubber bushing 116 and a plug 120 removably inserted therein are provided to permit the final vacuum to be destroyed prior to removal of the filter unit 115. The plug 120 normally seals the vent hole 119 but is withdrawn after the flask is removed from the brewing receptacle and returned to upright disposition.

The combination shown in Fig. 12 is employed in substantially the same manner as the other forms of our invention. It may be employed with nearly any type of brewing receptacle since the rim 121 of the filter unit is cut away to provide recesses 122 that serve as fluid channels into the flask when the flask is placed up-side-down on the bottom of a brewing receptacle. The only disadvantage of this simplified combination is the minor one that it is necessary to wipe adhering matter from the neck of the flask when the flask is removed from the brewing receptacle.

We have described our preferred method and our preferred apparatus for performing the method in specific detail for the purpose of disclosure and to illustrate the principles involved. It will readily occur to those skilled in the art that both the procedure and the apparatus may be widely modified without departing from our inventive concept. For example, an alternative procedure for use of the apparatus described would be:

1. Place measured amount of water in brewing receptacle and place brewing receptacle on heating unit.
2. Place enough water in flask to cover its bottom, attach filter unit, and bring water in flask to a boil over another heating unit.
3. When water in brewing receptacle has come to desired temperature, place a measured amount of ground coffee in brewing receptacle and agitate to insure complete mixture of grounds with water.
4. When elected brewing period has elapsed, invert flask and filter unit into brewing receptacle, allowing infusion to be drawn into flask.
5. Re-invert flask and remove filter unit. Also, it is apparent that the cylindrical shield is not As best shown in Fig. 9, in this form of our invention the cylindrical shell 36 of the filter unit 24 has an inwardly directed annular flange 38 to retain a replaceable filter assembly 40 that slidingly fits into the cylindrical shell. The filter assembly 40 includes an outer sheet metal ring 41 and an inner sheet metal ring 42, the two rings cooperating to engage a marginal portion of the filter cloth 37. The inner ring 42 in our preferred construction has a conical portion 43, a radial portion 45, and a relatively short cylindrical portion 46, the radial portion 45 of the inner ring cooperating with a radial flange 47 of the outer ring 41 and the cylindrical portion 46 of the inner ring cooperating with a cylindrical portion 48 of the outer ring to grip the filter cloth 37. The filter assembly 40 is held together in some suitable manner, for example, by a series of tongues 50 cut in the cylindrical portion 48 of the outer ring 41 and bent upward around the shorter cylindrical portion 46 of the inner ring 42.

Preferably a suitable resilient gasket 51 is included in the filter assembly 40, the gasket resting against the inner surface of the conical portion 43 of the inner ring 42 for pressure against a flared rim 52 formed at the mouth of the flask 21. It is to be noted that if such a sealing gasket is effective and if the cylindrical shell 36 is relatively long, the filter unit will not only prevent solids from adhering to the neck 23 of the flask, but will also prevent any contact whatsoever of liquid in the brewing receptacle with the outer surface of the flask neck.

While such a filter unit may be fitted and retained on the flask in any suitable manner, it is desirable that the filter unit be attached in some positive manner and it is further desirable that the filter unit cooperate with the flask to provide effective pressure against the sealing gasket 51. A feature of this form of our invention is that we provide for the filter unit 24 to cooperate with the flask handle 35 to releasably latch the filter unit to the flask and to create the desired pressure on the sealing gasket. One manner in which the various parts may be designed for such cooperation may be understood by referring to Figs. 6, 7, 8, and 10.

The lower end of the cylindrical shell 36, as viewed in Figs. 6 and 10, is cut away to provide a relatively large recess 53 and two bayonet slots 55 diametrically opposite each other. An outer band 56 attached to the lower end of the shell 36 by suitable rivets 57 to serve as reinforcement is cut away to correspond with the recess 53 and the bayonet slots 55. A radially extending handle 58 is attached to the lower end of the shell 36 by suitable means such as an embedded screw 60.

To cooperate with the filter unit 24 the flask handle 35 is carried by a band 61 that rotatably embraces the flask at the base of the neck 23. The band 61 may be of split construction to provide a pair of outwardly extending ends 62 that are attached to opposite sides of the handle 35 by suitable bolts 63. In the particular construction shown in the drawings the band 61 rotatably seats in a ring 65 that has edge flanges 66 (Fig. 8) to prevent axial movement of the band. The ring 65 may be of split construction to facilitate assembly to the flask and may be provided with a suitable liner 67 of rubber or like material. To form a circumferential seat to hold the ring 65 against axial movement on the flask neck 23, the flask neck may form an annular shoulder 68.

The filter unit 24 is adapted to slip over the neck 23 of the flask with the bayonet slots 55 aligned with complementary bayonet lugs 70 on the handle band 61. The recess 53 that is cut in the lower end of the filter unit clears the band ends 62 by sufficient spacing to permit such relative rotation between the handle band and the filter unit as may be required to cause the bayonet lugs 70 to ride up the lower inclined edges 71 of the slots (Fig. 6) with a cam action that both locks the filter unit to the handle band and pulls the filter unit downward to place the sealing gasket 51 under pressure. It will be noted in Fig. 7 that the filter unit handle 58 is sufficiently close to the flask handle 35 to enable a person in operating the device to encircle both handles at once with his hand and urge the two handles together in the rotary direction required to cause the described engagement. It is to be further noted that the operator may subsequently manually force the two handles 35 and 58 in the opposite relative directions to cause release of the bayonet engagement, the two lugs 70 riding against the upper inclined edges 72 of the bayonet slots to provide a cam action that serves to force the filter unit upward, thereby breaking the seal. In the operation of our device this cam action is of great advantage in releasing the suction in the flask subsequent to the transfer of the infusion into the flask, thereby allowing immediate removal of the filter.

In carrying out the previously described method represented by Figs. 2 to 5, we contemplate that the filter unit 24 will be placed on the flask neck immediately after the flask is replaced on the burner 27 to heat the residual liquid in the flask. An important advantage of placing the filter unit on the flask well in advance of the removal of the flask from the burner to the inverted position in the receptacle 20 is that if the filter member spans the mouth of the flask while steam is being generated by the heating of the residual liquid, the filter member will restrict the outward flow of steam and tend to raise the pressure in the flask slightly above atmospheric. Under such conditions with steam escaping from the flask through numerous minute passages in the filter member, air is effectively displaced from the interior of the flask and at the same time fresh air is prevented from entering the flask. This particular function of the filter unit is of special importance if the mouth and neck of the flask are relatively large in diameter as shown. It should be further noted in this aspect of the invention that the filter member serves as a barrier to prevent eddies of fresh air from swirling into the neck of the flask when the flask is moved bodily from the burner to the inverted filtering position.

Once steam starts to condense in the flask, the partial vacuum is formed rapidly and liquid from the brewing receptacle is quickly transferred to the interior of the flask. The operator may observe the liquid level in the brewing receptacle to judge when the fluid transfer is complete or may wait for violent turbulence in the flask to indicate the completion of the liquid transfer. The violent turbulence is caused by air flow into the flask after the liquid level in the brewing receptacle drops to the mouth of the flask. It is not necessary for the operator of the apparatus to watch for the completion of the liquid transfer or to be at the apparatus immediately after such transfer is made because the transferred liquid will remain in the inverted flask indefinitely, a liquid seal forming automatically to close off the essential to the practice of the invention, and it is further apparent that any suitable expedient may be employed to filter the liquid that streams into the inverted flask when the partial vacuum is created. We specifically reserve the right to all such changes, modifications, and substitutions that properly lie within the scope of our appended claims.

We claim as our invention:

1. In an apparatus of the class described, a device for use with a flask in practicing the described method, said device comprising: a hollow body shaped and dimensioned for releasable engagement with said flask to serve as a base to support the flask in inverted position and to form with the flask a fluid passage into the interior of the flask; means to form a seal between said body and said flask around said fluid passage; and a filter means disposed across said hollow body to filter fluid flowing into said flask.

2. In an apparatus of the class described, a device for engagement with the neck of a flask in the practice of the described method, said neck having a fluid passage therethrough, said device comprising: a hollow body dimensioned for releasable telescoping engagement with said neck of the flask to serve as a base to support the flask in inverted position; circular means effective between said body and said neck of the flask to form a seal around said fluid passage; and a filter means disposed across said hollow body to filter fluid flowing into said flask through said fluid passage.

3. In an apparatus for extracting an infusion from steeping solids, the combination of: a flask having a mouth; a hollow body releasably engaging said flask about said mouth and shaped and dimensioned to serve as a base for supporting the flask in inverted position and to form with the flask a fluid passage into the interior of the flask; means to form a seal between said body and said flask around said fluid passage; and filter means disposed across said hollow body to filter fluid flowing into said flask.

4. In an apparatus for extracting an infusion from steeping solids, the combination of: a flask provided with a neck having a fluid passage therethrough; a hollow body releasably engaging said neck in telescopic relation and dimensioned to serve as a base to support the flask in inverted position; circular means effective between said body and said neck of the flask to form a seal around said fluid passage; and a filter means disposed across said hollow body to filter fluid flowing into said flask through said fluid passage.

JUSTIN ARNOLD VARNEY.
FRED M. VARNEY.
GEORGE HANNAN VAN BRUNT.